(12) United States Patent
Gehin

(10) Patent No.: US 10,850,931 B2
(45) Date of Patent: Dec. 1, 2020

(54) TRANSFER OF OBJECTS

(71) Applicant: SIDEL ENGINEERING & CONVEYING SOLUTIONS, Reichstett (FR)

(72) Inventor: Anthony Gehin, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 16/339,023

(22) PCT Filed: Oct. 3, 2017

(86) PCT No.: PCT/FR2017/052713
§ 371 (c)(1),
(2) Date: Apr. 3, 2019

(87) PCT Pub. No.: WO2018/065721
PCT Pub. Date: Apr. 12, 2018

(65) Prior Publication Data
US 2019/0233221 A1 Aug. 1, 2019

(30) Foreign Application Priority Data
Oct. 4, 2016 (FR) .................................... 16 59569

(51) Int. Cl.
*B65G 47/82* (2006.01)
*B65G 47/52* (2006.01)

(52) U.S. Cl.
CPC ............. *B65G 47/82* (2013.01); *B65G 47/52* (2013.01)

(58) Field of Classification Search
CPC ........ B65G 47/52; B65G 47/71; B65G 47/82; B65G 2201/0244
USPC .................................... 198/429, 456, 468.11
See application file for complete search history.

(56) References Cited

U.S. PATENT DOCUMENTS

| | | | | |
|---|---|---|---|---|
| 3,311,217 A | * | 3/1967 | Muhlenbruch | ......... B65B 21/06 198/429 |
| 6,328,153 B1 | * | 12/2001 | Manghi | ................ B65G 47/086 198/468.11 |
| 7,784,599 B2 | * | 8/2010 | Balleza | .................. A21C 9/085 198/429 |

(Continued)

FOREIGN PATENT DOCUMENTS

| | | |
|---|---|---|
| EP | 3 112 298 A1 | 1/2017 |
| GB | 2 419 578 A | 5/2006 |
| WO | 2014/073690 A1 | 5/2014 |

OTHER PUBLICATIONS

International Search Report, dated Jan. 17 2018, from corresponding PCT/FR2017/052713 application.

(Continued)

*Primary Examiner* — James R Bidwell

(57) ABSTRACT

Disclosed is a device for transferring objects from an accumulation surface to a downstream conveyor, including a first mobile strip, a second mobile strip arranged beyond the first mobile strip from the accumulation surface, a fixed surface arranged between the two mobile strips, and a element for transferring objects from the accumulation surface to the first and second mobile strips, and to the fixed surface. Also disclosed is a transfer method using such transfer device.

18 Claims, 1 Drawing Sheet

(56) References Cited

U.S. PATENT DOCUMENTS

| | | | |
|---|---|---|---|
| 2009/0000145 A1* | 1/2009 | Cao | F06D 58/04 |
| | | | 34/242 |
| 2010/0281823 A1* | 11/2010 | Stahl | B65B 23/14 |
| | | | 198/429 |
| 2012/0325622 A1 | 12/2012 | Gatos | |
| 2015/0298526 A1 | 10/2015 | Miyakoshi et al. | |
| 2017/0001810 A1 | 1/2017 | Gehin | |

OTHER PUBLICATIONS

EP Search Report, dated Jan. 11 2018, from corresponding EP17194503 application.

\* cited by examiner

TRANSFER OF OBJECTS

This invention relates to the field of conveying objects as part of an industrial processing line. It relates more particularly to a device for transferring objects, able to transfer objects from an accumulation surface to a downstream conveyor, a unit using such a device, as well as a corresponding method.

Different solutions exist to move objects from an accumulation surface to a conveyor.

The document WO2014073690 proposes a device for transfer from an accumulation surface to an output conveyor, having an automated transfer means equipped with a handling head. This type of device pushes objects from the accumulation surface to the output conveyor, which necessitates the stopping of the output conveyor so as to reduce the risks of falling objects. These stops create gaps in the flow of objects exiting from the device. The gaps thus produced must be eliminated downstream from the device by dedicated means.

This invention has as its object to eliminate these drawbacks at least in part. For this purpose, it proposes a device for transfer from an accumulation surface to a downstream conveyor, having a first moving belt, characterized in that it has a second moving belt, positioned beyond the first moving belt coming from the accumulation surface, a stationary surface positioned between the two moving belts, and a means for transfer from the accumulation surface to the first and second moving belts, and to the stationary surface.

As a result of these arrangements, the objects are transferred from the accumulation surface to the downstream conveyor continuously, without it being necessary for the downstream conveyor to be stopped. Thus, the output flow of objects does not have any gaps, and it is possible to eliminate the installation of devices dedicated to the filling of gaps downstream. Further, by installing at the input of the accumulation surface a device having a mirrored effect, an arrangement of the objects on the downstream conveyor is obtained precisely in the same order as that with which they arrived from upstream.

According to other characteristics:
  said transfer means can be a means for pushing objects, configured to push two rows of objects, crosswise in relation to the direction of the first moving belt, which constitutes an effective and inexpensive transfer means; the push means disengaging vertically concurrently,
  said push means can have two vertical walls, each configured to push one of said two rows of objects; thus, a better reliability of the pushing of the first row is obtained, while avoiding the risk of staggering of the objects between the two rows,
  said push means can have a third vertical wall positioned beyond the second vertical wall in such a way as to support the objects of the second row during the pushing of the two rows of objects, this making it possible to reduce the risks of falling objects during their transfer,
  said push means can extend over the length of said two rows of objects and have in cross-section a shape of two adjacent and inverted U's, the legs of the two U's forming the three vertical walls, constituting a simple and strong means of embodiment,
  said stationary surface can have a width that is at least equal to the width of the U, this making it possible for said push means to be engaged with the objects that are present on the stationary surface without interfering with the objects that are present on the moving belts.

This invention also relates to a unit comprising a device according to the invention, and an accumulation surface that is a conveyor belt, having a width approximately equal to the length of said rows, and provided with an actuator able to cause it to advance step by step.

As a result of these arrangements, the movement of the transfer device is reduced when it goes to search for a batch of objects. Further, it is advantageous to use an accumulation surface in the form of a moving belt, since that makes it possible to free gradually the area where it receives the new products.

Finally, this invention relates to a method of transfer by means of a transfer device according to the invention, and having the following steps:
  pushing of a first row of objects from the accumulation surface onto the stationary surface and of a second row of objects from the accumulation surface onto the first moving belt,
  actuation of the first moving belt in such a way as to route the objects from said second row to said downstream conveyor, and, before the first moving belt is empty, pushing of said first row of objects onto the second moving belt,
  actuation of the second moving belt in such a way as to route the objects from said first row to said downstream conveyor.

As a result of these arrangements, the objects are transferred from the accumulation surface to the downstream conveyor in a continuous manner, without it being necessary that the downstream conveyor be stopped. Thus, the output flow of objects does not have gaps, and it is possible to eliminate the installation of devices dedicated to the filling of possible gaps downstream.

This invention will be better understood upon reading the detailed description that follows, with reference to the accompanying figures in which.

Figure 1:
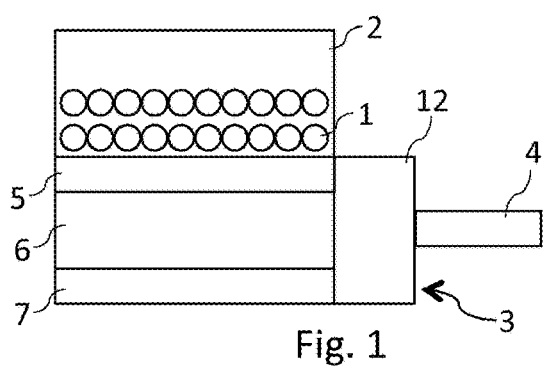
FIGS. 1 to 6 are views from above of a transfer device according to the invention, in a preferred sequence of use.

The accumulator shown in FIGS. 1 to 6 is placed between an upstream machine and a downstream machine. The upstream machine supplies an input conveyor, not shown, by a flow of objects 1 in the form of a single file. The accumulator has an accumulation surface 2 and a transfer device 3 according to the invention. An input device, which can be of a type known to a person skilled in the art and not presented in detail here, transfers the objects 1 from the input conveyor to the accumulation surface 2, in a direction approximately crosswise to the movement of the objects 1 on the input conveyor. The objects 1 can be stored for a certain time on this accumulation surface 2, for example if the downstream machine is slowed down or stopped. The transfer device 3 then transfers the objects 1 from the accumulation surface 2 to a downstream conveyor 4, which causes the objects 1 to move away in a direction approximately parallel to the input conveyor. The downstream conveyor 4 then supplies the downstream machine by a flow of objects 1 in the form of a single file.

The transfer device 3 has a first moving belt 5, a stationary surface 6 and a second moving belt 7. The two moving belts 5, 7 and the stationary surface 6 are positioned as shown in FIGS. 1 to 6, side by side parallel to each other, next to the accumulation surface 2 and on the other side of the accumulation surface 2 relative to the input conveyor. The transfer device also has a transfer means 8.

According to a first embodiment, the transfer means 8 is an automated means for grasping a row, and alternatively transfers a row to each of the moving belts 5 and 7. This, however, necessitates a lifting of the objects 1, and therefore a rather sophisticated grasping means.

According to another embodiment, the transfer means 8 is a means for pushing two rows of objects 1 at the same time. This makes it possible to push two rows, one of which will be pushed onto the stationary surface 6, and the second onto the first moving belt 5. While the objects 1 from the first moving belt 5 are removed toward the output, the push means then pushes the objects 1 from the stationary surface 6 onto the second moving belt 7.

In the following description, the transfer means 8 will also be called push means 8.

According to another embodiment, the push means 8 has two parallel walls, each being provided to push one of the two rows of objects 1. It is possible to envision adding there a third parallel wall, which will be used to support the objects 1 of the first row during the pushing, so that the pushing does not unbalance them. Each wall can have a panel or else one or more longitudinal tubular side members.

According to the embodiment shown in the drawings, the push means 8 is as shown in FIGS. 7 to 12; its cross-section has a double U shape and is open downward. The push means 8 comprises three vertical walls 9, 10, 11, which form the three vertical walls mentioned above. The push means 8 moves above the accumulation surface 2, above the moving belts 5, 7 and above the stationary surface 6. The movement of the push means 8 can, for example, be controlled by a robot. The push means 8 can be moved in a direction that is transverse to the moving belts 5, 7 and to the stationary surface 6, in particular a perpendicular direction, which is also perpendicular to the downstream edge of the accumulation surface. One of the walls 9, 10 of the push means can push objects 1 from the accumulation surface 2 to the first moving belt 5, from the first moving belt 5 to the stationary surface 6, or from the stationary surface 6 to the second moving belt 7. The push means 8 can also be lifted up above the objects 1 into an inactive position, so that its walls 9, 10, 11 are no longer engaged with the objects 1. The push means 8 pushes the objects 1, and they are surrounded by the walls 9 and 10 or by the walls 10 and 11. Thus, while one of the walls 9, 10 pushes the object 1, another wall 10, 11 located in front of the movement prevents it from falling forward. The support of the objects 1 while they are pushed is therefore optimal, and the risk of falling is minimized.

The transfer device also has a junction means 12, able to unite the two moving belts 5, 7 in a single file and thus to supply the downstream conveyor 4. Such a junction means 12 optionally comprises a solution of the guiding type that folds the line of one and/or of the other moving belt onto a unified column. Moreover, it can have a means for synchronizing the two moving belts 5, 7 to ensure that the objects 1 coming from the first moving belt 5 are inserted between two batches of objects 1 coming from the second moving belt 7.

We are now going to describe the operation of the transfer device 3 according to the invention, by relying on FIGS. 1 to 12.

Figure 7:
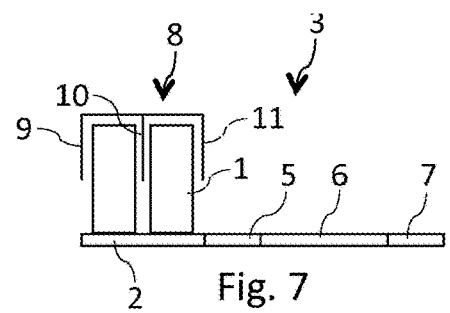
FIGS. 7 to 12 are vertical cutaway views of a transfer device according to the invention, in a preferred sequence of use.

Initially, as shown in FIGS. 1 and 7, the accumulation surface 2 has at least two rows of objects 1. The push means 8 is placed above the two rows, in such a way that its walls 9, 10, 11 are engaged with the two rows of objects 1.

Figure 2:
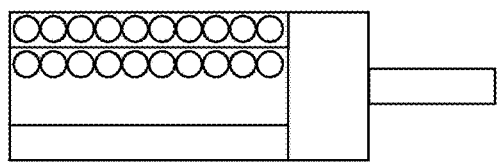
Figure 8:
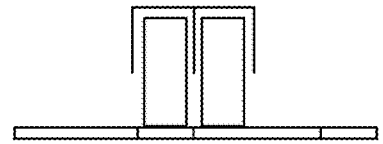

The push means 8 is then moved transversely until it is above the first moving belt 5 and above the stationary surface 6. The two rows of objects 1 are pushed simultaneously by the push means 8, and the situation illustrated in FIGS. 2 and 8 is reached: one of the rows is found on the first moving belt 5, and the second row is found on the stationary surface 6.

Figure 3:
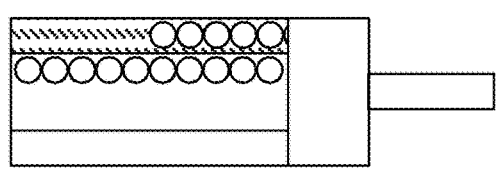
Figure 9:
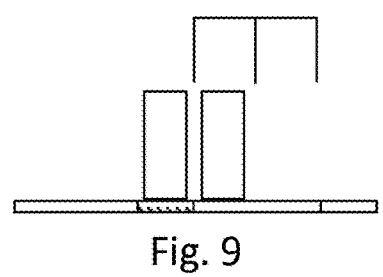

The first moving belt 5 is then activated, and the objects 1 that are present on the first moving belt 5 move toward the junction means 12. During this time, the push means 8 is raised up in an inactive position and is moved to disengage from the first row, located on the first moving belt 5, in order to take up no more than the second row, located on the stationary surface 6. This situation is illustrated in FIGS. 3 and 9.

Figure 4:
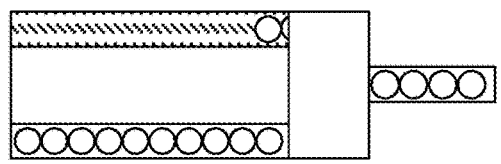
Figure 10:
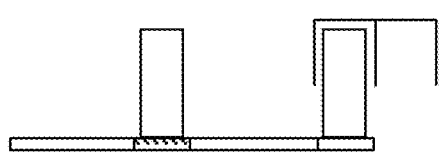

The push means 8 then comes down into active position, so that the objects 1 that are present on the stationary surface 6 are engaged with the push means 8, surrounded by two walls 9, 10. The objects 1 that are present on the stationary surface 6 are then pushed toward the second moving belt 7, and this push is ended preferably before the objects 1 that were on the first moving belt 5 have all entered into the junction means 12, as illustrated in FIGS. 4 and 10.

Subsequently, the moving belts 5, 7 attain in turn a nominal speed from a zero speed that they have when they receive the products or objects 1, this nominal speed corresponding to the speed of the downstream conveyor 4. The junction means 12 then ensures that the batches from the first moving belt 5 and from the second moving belt 7 follow each other, while avoiding a gap between two successive batches, coming from two different belts.

Figure 5:
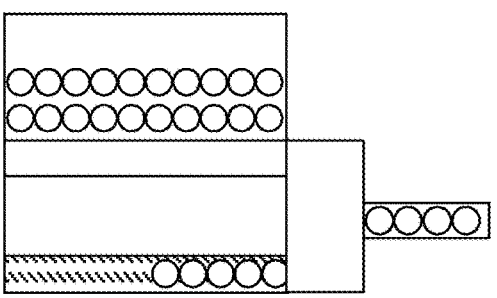
Figure 11:
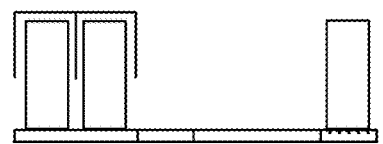
Figure 6:
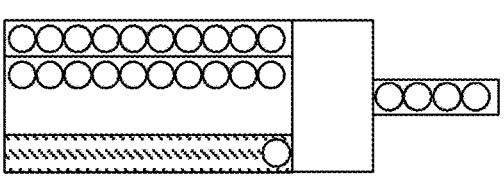
Figure 12:
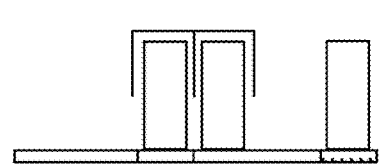

At the time when all of the objects 1 that were present on the first moving belt 5 have finished exiting it, the first moving belt 5 is stopped, and the second moving belt 7 is at the nominal speed. Preferably, the second belt 7 commences before the stopping of the first belt 5. Depending on the mode of operation of the junction means 12 and the speeds of the moving belts 5, 7, the second moving belt 7 can be activated slightly before or after the stopping of the first moving belt 5. While the objects 1 present on the second moving belt 7 move toward the junction means 12, the push means 8 is raised up into inactive position, moved until it is above the accumulation surface 2, then comes down into active position normally above two following batches to be handled. The device is then as illustrated in FIGS. 5 and 11, with the push means 8 returned to its initial position of FIG. 7.

The push means 8 is then moved transversely until it is above the first moving belt 5 and above the stationary surface 6, pushing a first row of objects 1 onto the first moving belt 5 and a second row of objects 1 onto the stationary surface 6. This push can be ended before the objects 1 that were present on the second moving belt 7 have all entered into the junction means 12. The transfer device is then in the situation illustrated in FIGS. 6 and 12.

At the time when all of the objects 1 that were on the second moving belt 7 have entered into the junction means, the device is again found in the situation shown in FIGS. 2 and 8. The transfer of the objects 1 from the accumulation surface 2 to the downstream conveyor 4 can then continue, by continually repeating the steps described above.

The fact of having two moving belts 5, 7, onto which the objects 1 are transferred after their accumulation, makes it possible for the downstream conveyor 4 to be supplied continuously, without any gap being formed in the flow of objects 1. This makes it possible to avoid placing additional devices dedicated to the filling of these gaps, which complicate the installation.

If only these two moving belts 5, 7 were all there was, without the intermediate stationary surface 6, it would potentially be necessary to stop the two moving belts 5, 7 at the same time to push objects 1 onto these belts from the accumulation surface 2, and it would then not be possible to supply the downstream conveyor 4 continuously.

The stationary surface 6 provides the possibility of placing objects 1 between the two belts 5, 7 in such a way that while the first moving belt 5 begins, then accelerates to supply the downstream conveyor 4, it is possible to push these objects 1 onto the second moving belt 7 without disturbing the objects 1 located on the first moving belt 5. The latter 5 can deliver all of its objects 1 to the downstream conveyor 4, then slow down until stopping, to be ready to receive a new batch by pushing from the accumulation surface. The second moving belt 7 is then ready to deliver in turn objects 1 to the downstream conveyor 4, and thus supplying the downstream conveyor 4 continuously, without gaps, is achieved.

In addition, the transfer device 3 according to the invention, as a result of the stopping of the moving belts 5, 7 during the transfer and in the preferred embodiment of the drawings thanks to the particular shape of its push means 8, makes it possible for the objects 1 to remain stable during their transfer. Thus, it can be used at high speeds without the risk of falling objects 1 or of jamming.

Furthermore, the invention makes it possible to transfer the objects 1 from the accumulation surface 2 to a stopped belt 5, 7, if required while passing by the stationary surface 6. The first belt 5 is stopped when the objects 1 are pushed from the accumulation surface 2 to the first belt 5 and the stationary surface 6, then is activated to supply the downstream conveyor 4. At this time, the second moving belt 7 is stopped, which makes it possible to push the objects 1 from the stationary surface 6 to this second belt 7, which is then activated to ensure the continuity of the objects 1 on the downstream conveyor 4 when the first belt 5 has finished delivering its objects 1, and is again stopped. Therefore, a continuity of objects 1 on a downstream conveyor 4 is readily obtained, always moving at a nominal speed, whereas the objects 1 are transferred by a very simple and inexpensive means, such as sweeping with support by the bottom, between flush surfaces, namely the accumulation surface, the first moving belt 5, the stationary surface 6 and the second moving belt 7. This simple means is also a universal means, without need for adaptation for different sizes of objects 1 to push.

In particular embodiments, the transfer means 8 takes the form of two separate tools. Thus, the first tool ensures the transverse transfer of a pair of columns of objects 1, one column on the first moving belt 5 and one column on the stationary surface 6. The other tool ensures, for its part, the subsequent transfer of a column of objects 1 from the stationary surface 6 onto the second moving belt 7. It is then possible to superpose at least partly the operating cycles, respectively of the first tool and of the second tool, namely the bringing of two batches onto a belt and the stationary surface, and the bringing of a batch from the stationary surface onto the other belt. The removal of two batches from the accumulation surface 2 is therefore performed in a cycle that takes place at least in part while another cycle occurs during which a batch is brought from the stationary surface 6 to the moving belt concerned. This contributes particularly to the cycle time. Further, the second tool can be of simple design, since it does no more than pull a batch from the stationary surface 6 onto the second moving belt 7.

In still other embodiments, the transfer means 8 deals simultaneously with a single batch, and therefore deals with, one after the other, the batch destined for the first moving belt 5 and the batch destined for the second moving belt 7. The transfer means 8 can therefore be particularly simple. The method of operation can then be the following.

In the initial step, a second batch is found on the stationary surface 6, at the end of the preceding cycle. The first step from then on consists essentially, for the transfer means 8, in shifting a first batch from the accumulation surface 2 onto the first moving belt 5. The latter can then be put into motion to clear the objects 1 that form the batch that it carries. During this time, the second step of the method consists essentially—for the transfer means 8—in shifting the second batch onto the second moving belt 7, then onto the stationary surface 6. The second moving belt 7 is put into motion in such a way as to ensure farther downstream the junction into a continuous single file, respectively of the first batch and of the second batch. Once all of the products 1 from the first batch have been cleared from opposite the accumulation surface 2 and therefore do not disturb a transverse transfer of the objects 1 from the entire accumulation surface 2, the third step consists, for the transfer means 8, in shifting a new second batch onto the stationary surface 6, which then brings the system to the initial configuration.

A particularly simple configuration is thus obtained.

By "accumulation surface 2" is meant a buffer surface that receives objects that are channeled between two machines that deal with them, for example, on one line or several lines. This accumulation surface makes it possible that the stopping of the downstream machine does not cause the stopping of the upstream machine and vice versa.

As previously indicated, the transfer device comprises a first and a second moving belt 5, 7 and a stationary surface 6 placed between the two moving belts 5, 7. It also comprises a means 8 for transfer from the accumulation surface 2 to the first and second moving belts 5, 7, and to the stationary surface 6, particularly with a single tool or two tools that can work simultaneously.

The accumulation surface 2 and the downstream conveyor 4 are respectively at the entrance and exit of the transfer device 3. This device 3 has the function of moving the objects from the accumulation surface 2 to the downstream conveyor 4. Consequently, the accumulation surface 2 and the transfer device 3 can form a unit. Such a unit can further comprise the downstream conveyor 4.

The unit thus comprises the transfer device 3 as indicated above and an accumulation surface 2 that is a moving conveyor belt or a sliding plate. The accumulation surface 2 comprises an upstream side that is farthest from the transfer device 3 and that is opposite a downstream side in an accumulation direction. The downstream side of the accumulation surface 2 is placed in an adjacent manner to the length of the first moving belt 5, and the accumulation direction is transverse to the direction of the first moving belt 5.

The accumulation surface 2 generally has a rectangular shape. Within the framework of this invention, the sides of the accumulation surface 2 that extend in the accumulation direction are called length, and the upstream and downstream sides of this same surface 2 are called width.

The width of the accumulation surface 2 that thus corresponds in particular to the downstream side can be approximately equal to the length of the rows of objects 1.

In the embodiment where the accumulation surface 2 is a conveyor belt, it can be provided with an actuator able to cause it to advance, particularly step by step, in particular in the accumulation direction toward the first moving belt 5.

In another embodiment where the accumulation surface is a sliding plate, the objects 1 supported by this plate can be moved from upstream to downstream with the transfer means 8 or another similar tool, i.e., a push means, configured to push one or more rows of objects 1.

A tool, identical to or different from the transfer means 8, can be used to move the objects 1 from an upstream conveyor to the accumulation surface 2.

Although the above description is based on particular embodiments, it is in no way limiting of the scope of the invention, and modifications can be made, particularly by substitution of technical equivalents or by a different combination of all or part of the characteristics developed above.

The invention claimed is:

1. Device (3) for transfer from an accumulation surface (2) to a downstream conveyor (4), said transfer device comprising:
    a first moving belt (5),
    a second moving belt (7), positioned beyond the first moving belt (5) coming from the accumulation surface (2),
    a stationary surface (6) positioned between the first and second moving belts (5, 7), and
    a transfer apparatus (8) for transferring from the accumulation surface (2) to the first and second moving belts (5, 7), and to the stationary surface (6),
    wherein the downstream conveyor (4) is operable in a direction approximately parallel to the first and second moving belts (5, 7)
    wherein the transfer device (8) is a single tool or separate tools configured to work simultaneously.

2. Transfer device (3) according to claim 1, in which said transfer apparatus (8) is configured to push two rows of objects (1), transversely relative to the direction of the first moving belt (5), for example two rows at a time, or only one row at a time.

3. Device according to claim 2, wherein said transfer apparatus (8) comprises two vertical walls (9, 10), each configured to push one of said two rows of objects (1).

4. Device according to claim 3, wherein said transfer apparatus (8) comprises a third vertical wall (11) positioned beyond the second vertical wall (10) so as to support the objects (1) of the second row during the pushing of the two rows of objects (1).

5. Device according to claim 4, wherein said transfer apparatus (8) extends over the length of said two rows of objects (1) and has in cross-section a shape of two adjacent and inverted U's, the legs of the two U's forming the three vertical walls (9, 10, 11).

6. Device according to claim 5, wherein said stationary surface (6) has a width at least equal to the width of the U.

7. Unit comprising a device according to claim 1, and an accumulation surface (2) that is a conveyor belt, having a width approximately equal to the length of said rows, and provided with an actuator able to cause it to advance, particularly step by step.

8. Method of transfer by means of a transfer device (3) according to claim 1, and having the following steps:
    pushing of a first row of objects (1) from the accumulation surface (2) onto the stationary surface (6) and of a second row of objects (1) from the accumulation surface (2) onto the first moving belt (5), particularly simultaneously, or else in two sequential steps,
    actuation of the first moving belt (5) in such a way as to route the objects (1) from said second row to said downstream conveyor (4), and, before the first moving belt (5) is empty, pushing of said first row of objects (1) onto the second moving belt (7), particularly acceleration of the first moving belt (5) up to the speed of the downstream conveyor (4) then circulation at its speed,
    actuation of the second moving belt (7) in such a way as to route the objects (1) from said first row to said downstream conveyor (4), particularly acceleration of the second moving belt (7) up to the speed of the downstream conveyor (4) then circulation at its speed.

9. A unit comprising a device according to claim 2, and an accumulation surface that is a conveyor belt, having a width approximately equal to the length of said rows, and provided with an actuator able to cause it to advance, particularly step by step.

10. A unit comprising a device according to claim 3, and an accumulation surface that is a conveyor belt, having a width approximately equal to the length of said rows and provided with an actuator able to cause it to advance, particularly step by step.

11. A unit comprising a device according to claim 4, and an accumulation surface that is a conveyor belt, having a width approximately equal to the length of said rows, and provided with an actuator able to cause it to advance, particularly step by step.

12. A unit comprising a device according to claim 5, and an accumulation surface that is a conveyor belt, having a width approximately equal to the length of said rows, and provided with an actuator able to cause it to advance, particularly step by step.

13. A unit comprising a device according to claim 6, and an accumulation surface that is a conveyor belt, having a width approximately equal to the length of said rows, and provided with an actuator able to cause it to advance, particularly step by step.

14. Method of transfer by means of a transfer device according to claim 2, and having the following steps:
    pushing of a first row of objects from the accumulation surface onto the stationary surface and of a second row of objects from the accumulation surface onto the first moving belt, particularly simultaneously, or else in two sequential steps,
    actuation of the first moving belt, in such a way as to route the objects from said second row to said downstream conveyor, and, before the first moving belt is empty, pushing of said first row of objects onto the second moving belt, particularly acceleration of the first moving belt up to the speed of the downstream conveyor then circulation at its speed,
    actuation of the second moving belt in such a way as to route the objects from said first row to said downstream conveyor, particularly acceleration of the second moving belt up to the speed of the downstream conveyor then circulation at its speed.

15. Method of transfer by means of a transfer device according to claim 3, and having the following steps:
    pushing of a first row of objects from the accumulation surface onto the stationary surface and of a second row of objects from the accumulation surface onto the first moving belt, particularly simultaneously, or else in two sequential steps,
    actuation of the first moving belt in such a way as to route the objects from said second row to said downstream conveyor, and, before the first moving belt is empty, pushing of said first row of objects onto the second moving belt, particularly acceleration of the first moving belt up to the speed of the downstream conveyor then circulation at its speed, actuation of the second moving belt in such a way as to route the objects from said first row to said downstream conveyor, particularly acceleration of the second moving belt up to the speed of the downstream conveyor then circulation at its speed.

16. Method of transfer by means of a transfer device according to claim 4, and having the following steps:

pushing of a first row of objects from the accumulation surface onto the stationary surface and of a second row of objects from the accumulation surface onto the first moving belt, particularly simultaneously, or else in two sequential steps, actuation of the first moving belt in such a way as to route the objects from said second row to said downstream conveyor, and, before the first moving belt is empty, pushing of said first row of objects onto the second moving belt, particularly acceleration of the first moving belt up to the speed of the downstream conveyor then circulation at its speed, actuation of the second moving belt in such a way as to route the objects from said first row to said downstream conveyor, particularly acceleration of the second moving belt up to the speed of the downstream conveyor then circulation at its speed.

17. Method of transfer by means of a transfer device according to claim 5, and having the following steps:

pushing of a first row of objects from the accumulation surface onto the stationary surface and of a second row of objects from the accumulation surface onto the first moving belt, particularly simultaneously, or else in two sequential steps, actuation of the first moving belt in such a way as to route the objects from said second row to said downstream conveyor, and, before the first moving belt is empty, pushing of said first row of objects onto the second moving belt, particularly acceleration of the first moving belt up to the speed of the downstream conveyor then circulation at its speed, actuation of the second moving belt in such a way as to route the objects from said first row to said downstream conveyor, particularly acceleration of the second moving belt up to the speed of the downstream conveyor then circulation at its speed.

18. Method of transfer by means of a transfer device according to claim 6, and having the following steps:

pushing of a first row of objects from the accumulation surface onto the stationary surface and of a second row of objects from the accumulation surface onto the first moving belt, particularly simultaneously, or else in two sequential steps, actuation of the first moving belt in such a way as to route the objects from said second row to said downstream conveyor, and, before the first moving belt is empty, pushing of said first row of objects onto the second moving belt, particularly acceleration of the first moving belt up to the speed of the downstream conveyor then circulation at its speed, actuation of the second moving belt in such a way as to route the objects from said first row to said downstream conveyor, particularly acceleration of the second moving belt up to the speed of the downstream conveyor then circulation at its speed.

* * * * *